United States Patent
Lemke et al.

(10) Patent No.: US 7,059,242 B2
(45) Date of Patent: Jun. 13, 2006

(54) COMPACTOR POSITION SENSING FOR MODULE BUILDER

(75) Inventors: Dwight D. Lemke, Geneseo, IL (US); Michael J. Covington, Bettendorf, IA (US); Hyppolite Kuissi, Moline, IL (US); Tracy R. Archer, West Liberty, IA (US)

(73) Assignee: CNH America LLC, New Holland, PA (US)

( * ) Notice: Subject to any disclaimer, the term of this patent is extended or adjusted under 35 U.S.C. 154(b) by 18 days.

(21) Appl. No.: 11/037,028

(22) Filed: Jan. 18, 2005

(65) Prior Publication Data

US 2005/0217513 A1    Oct. 6, 2005

Related U.S. Application Data

(60) Provisional application No. 60/557,888, filed on Mar. 30, 2004.

(51) Int. Cl.
*B30B 1/00* (2006.01)
*B30B 13/00* (2006.01)

(52) U.S. Cl. .......................... 100/226; 100/35; 100/46; 100/145; 100/258 A; 56/28; 56/341

(58) Field of Classification Search ................. 100/35, 100/43, 65, 66, 69, 145, 177, 178, 179, 46, 100/226, 258 R, 258 A; 56/16.6, 28, 341; 460/119
See application file for complete search history.

(56) References Cited

U.S. PATENT DOCUMENTS

| | | | |
|---|---|---|---|
| 3,749,003 A | 7/1973 | Wilkes et al. | 100/35 |
| 4,285,273 A | 8/1981 | Dejarnett | 100/35 |
| 4,793,126 A | 12/1988 | Wood et al. | 56/16.6 |
| 4,888,940 A | 12/1989 | Deutsch | 56/16.6 |
| 5,167,185 A | 12/1992 | Bass, III | 100/226 |
| 5,533,932 A | 7/1996 | Covington et al. | 460/119 |
| 5,584,762 A | 12/1996 | Buhler et al. | 460/119 |
| 6,074,298 A | 6/2000 | Majkrzak et al. | 460/119 |
| 6,176,779 B1 | 1/2001 | Riesterer et al. | 460/119 |
| 6,366,210 B1 * | 4/2002 | Lemke | 340/665 |
| 6,530,199 B1 | 3/2003 | Covington et al. | 56/16.6 |
| 6,536,197 B1 | 3/2003 | Covington et al. | 56/28 |
| 6,651,417 B1 | 11/2003 | Lackey | 56/341 |
| 2004/0026153 A1 | 2/2004 | Dershem et al. | 180/311 |

* cited by examiner

*Primary Examiner*—Derris H. Banks
*Assistant Examiner*—Jimmy T. Nguyen
(74) *Attorney, Agent, or Firm*—Michael G. Harms; John William Stader; Stephen A. Bucchiancri

(57) ABSTRACT

An apparatus and method for cotton module building utilizing one or more augers on a compactor frame movable for compacting cotton in a cotton compacting chamber of the module builder. The auger or augers are rotatable for moving accumulated cotton in opposite directions therein, and are tiltable by contact with cotton accumulated unevenly in the chamber. A position or positions of the auger or augers are sensed for detecting tilting of the auger or augers. A controller responsively controllably operates the auger or augers for moving cotton in contact therewith in an appropriate direction for reducing the tilting and more evenly distributing the cotton. The cotton can then be compacted into a cotton module having desired dimensions.

25 Claims, 7 Drawing Sheets

US 7,059,242 B2

COMPACTOR POSITION SENSING FOR MODULE BUILDER

This application claims the benefit of U.S. Provisional Application No. 60/557,888, filed Mar. 30, 2004.

TECHNICAL FIELD

This invention relates generally to control of a process for compacting and building a cotton module, and more particularly, to control of a cotton module building process using a compactor position signal.

BACKGROUND ART

With an on-board cotton module builder or packager parameters such as, but not limited to, the distribution of cotton within the module building chamber, the number of packing positions, and the number of compacting strokes, are all critical factors in forming a good rectangular module of compacted cotton that can be unloaded onto the ground as a stand alone module of cotton, and subsequently handled for transportation to the gin for processing. As is known, the distribution of the cotton within the module chamber is typically accomplished using augers attached to a compactor frame of compactor apparatus movable upwardly and downwardly in the chamber. During the compacting cycle, the augers are operated in a forward and/or reverse direction for distributing the cotton under the compactor apparatus. The number of packing positions is used to index or move the location of the compactor apparatus up within the chamber as the module is built from the bottom up. This ensures that there is space under the compactor in which to distribute the cotton. The number of packing strokes is the number of times that the cotton is pressed downwardly and compacted and more packing strokes ensures a good tight, cohesive module of cotton. The length of time that the augers run in the different directions, the number of packing positions, and the number of compaction strokes before raising or indexing the compactor apparatus to the next position are typically dependent upon set values that have been written in the electronic compaction program and stored in the compactor controller. These values are based on time, pressure, or both and are dependent on the amount of cotton that is coming into the module chamber. Under what are considered to be high yield conditions, generally three or more bales per acre, the amount of time the augers run forward and the amount of time they run rearward is different than under what is considered to be low yield conditions, one bale per acre. The number of compactor positions and compacting strokes are different in high yield cotton versus low yield cotton.

Additionally, it would be desirable to have the capability of determining the level of the cotton in a module builder in the forward and rearward regions thereof, respectively, to enable better determining which rotational direction the augers should be operated in for more evenly distributing the cotton. Particularly under varying yield conditions, it may be desirable to determine the direction of auger rotation when operation of the augers is initiated.

Therefore, what is sought is a control for a cotton module building process which can vary various parameters thereof, including, but not limited to, the direction and duration of auger operation at a function of cotton levels in the module builder.

SUMMARY OF THE INVENTION

What is disclosed is apparatus and a control for cotton module building which involves sensing relative position of portions of a cotton compactor located within the module builder, for determining levels of the cotton in different regions of the module builder, for determining a direction of operation of augers for distributing cotton within the module builder.

According to a preferred aspect of the invention, the augers are supported on a frame of the compactor apparatus located within the module builder, the frame being movable upwardly and downwardly by drivers, such as fluid cylinders or the like. Additionally, the frame is connected to the drivers or otherwise supported so as to be tiltable in at least the forward and rearward directions, such that the augers supported thereby are also tilted. As a result, when the frame and augers are lowered into contact with the cotton in the bottom of the module builder, if the cotton is uneven in height forwardly and rearwardly, the frame and augers will be tilted. At least one, and preferably two, compactor position sensors will detect the tilt or orientation of the frame and augers, and output a signal to a compactor control which will responsively determine an appropriate direction of rotation for the augers, and responsively output a control signal thereto for rotating the augers in the appropriate direction.

DETAILED DESCRIPTION OF THE INVENTION

Figure 1:
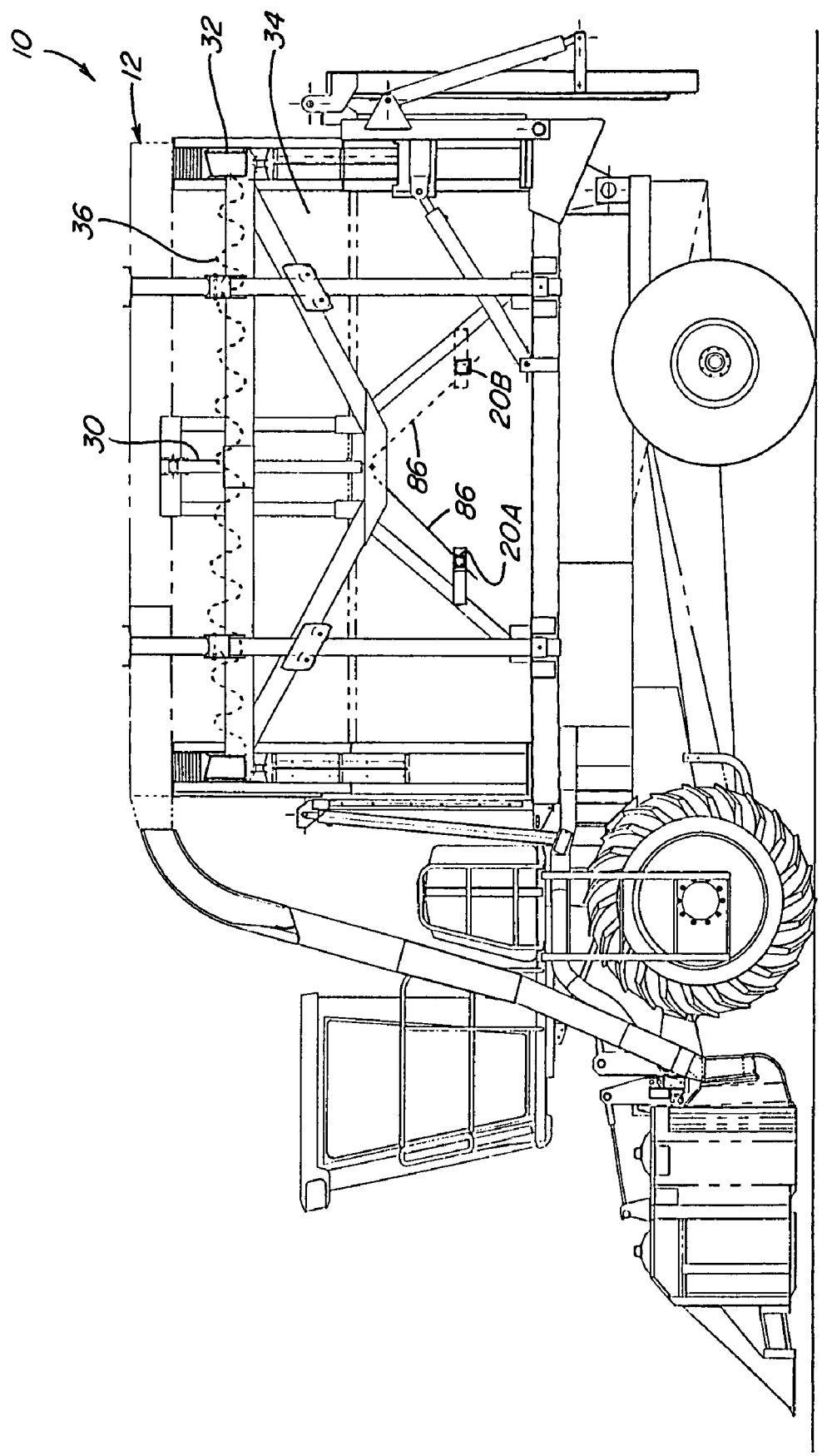
FIG. 1 is a side view of a cotton harvester including an on-board cotton module builder.

Turning now to the drawings, in FIG. 1, a cotton harvester 10 is shown, including an on-board cotton module builder 12 for compacting cotton harvested by harvester 10 into a unitary cotton module (not shown) according to the invention.

Figure 2:
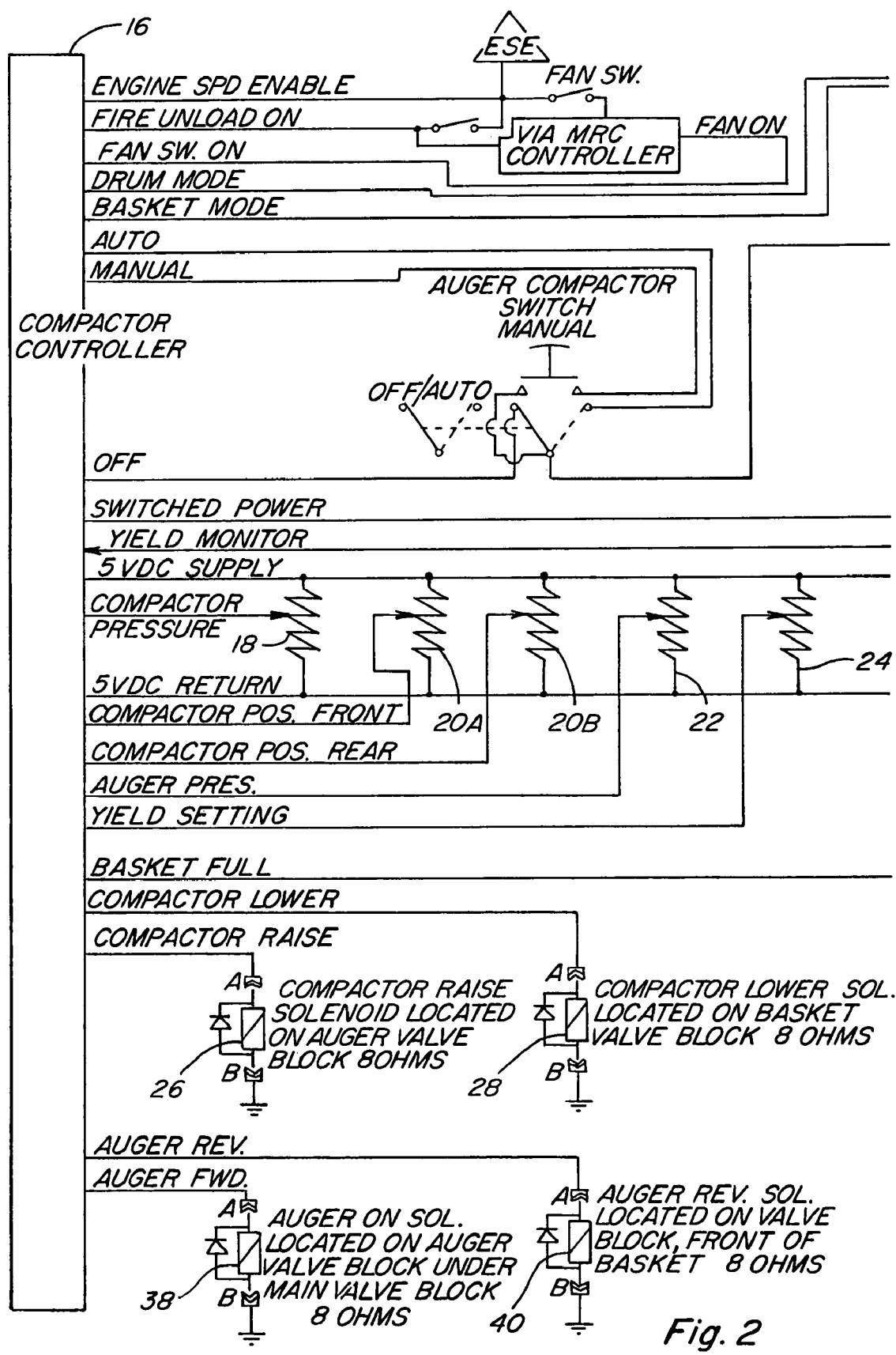
FIG. 2 is a schematic diagram of a cotton module builder control operable using a compactor position sensing routine according to the invention.
Figure 2A:
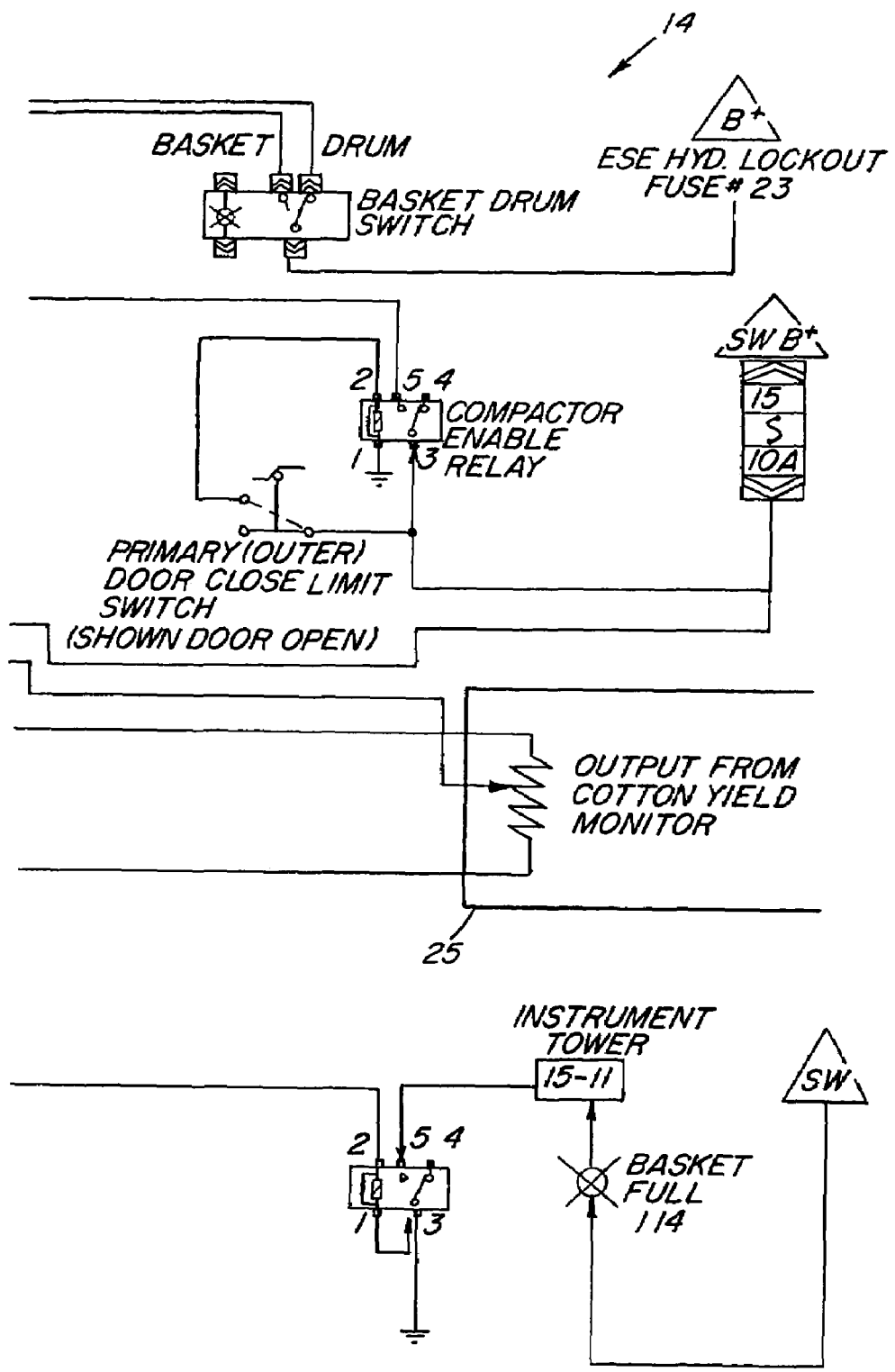
FIG. 2A is a continuation of the schematic diagram of FIG. 2.

Referring also to FIGS. 2 and 2A, circuitry of a compactor control 14 operable according to the present invention is shown. Control 14 includes a compactor controller 16 operable for receiving signals outputted by a number of devices, including, but not limited to, a compactor pressure signal from a compactor pressure sensor 18, compactor position signals outputted by two compactor position sensors 20A and 20B, auger pressure signal outputted by auger pressure sensor 22, and a yield signal outputted by an operator controlled yield setting 24 or a cotton yield monitor 25. Responsive to the signals from these devices, and/or other devices, controller 16 is operable for automatically responsively outputting signals to apparatus such as a compactor raise solenoid 26 and a compactor lower solenoid 28, which control compactor drivers, such as fluid cylinders 30 of module builder 12 (FIG. 1) operable for moving compactor apparatus 32 of module builder 12 upwardly and downwardly against cotton accumulated in a bottom region of a compactor chamber 34 of module builder 12. The drivers can also be used for setting or indexing the compactor position. Compactor control 14 is also operable for outputting signals to augers 36 (FIG. 1) of compactor apparatus 32, for effecting forward or reverse rotation thereof via an auger on solenoid 38 and an auger reverse solenoid 40.

Figure 3:
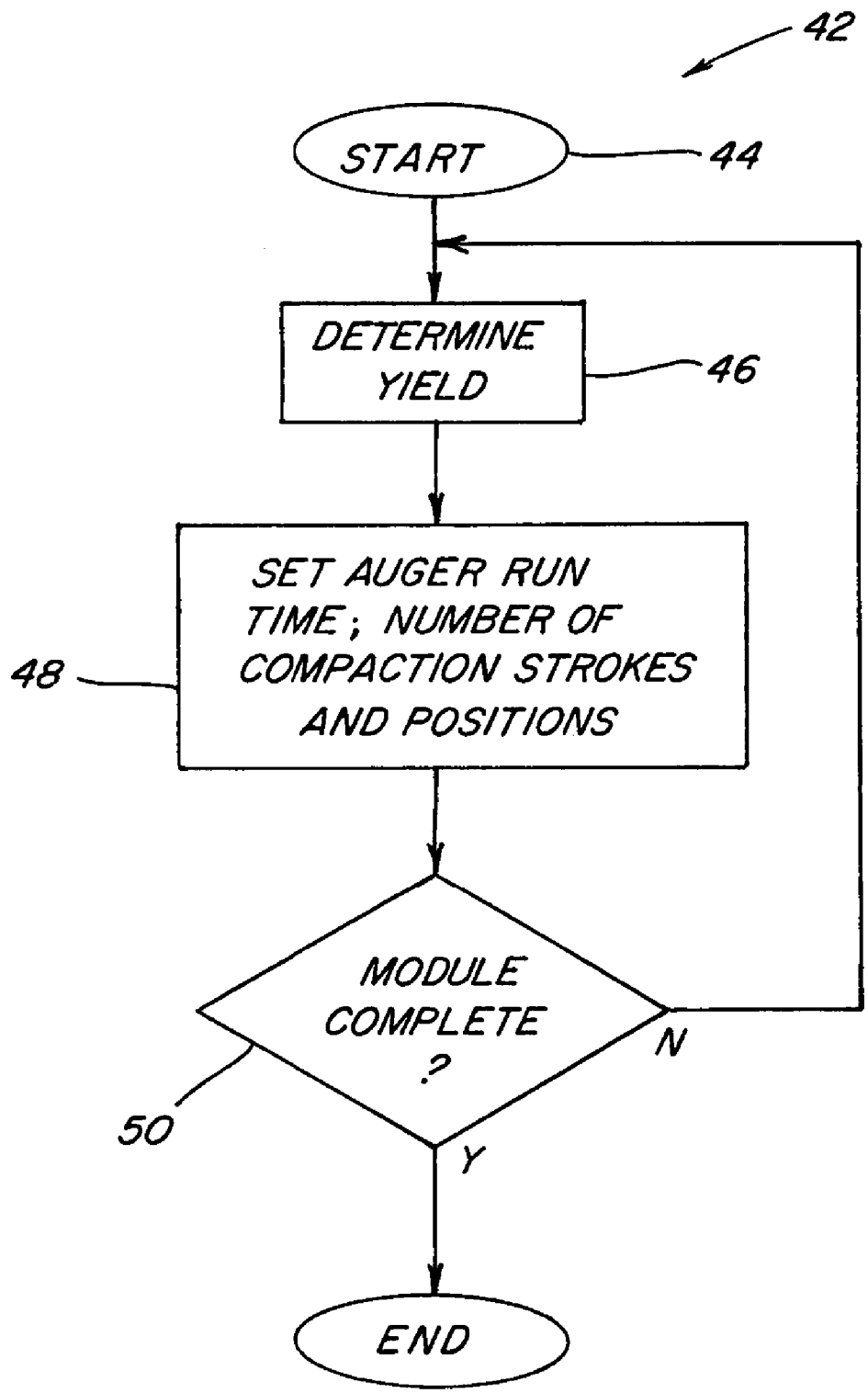
FIG. 3 is a high level flow diagram showing steps for operation of the control according to the invention.

Referring also to FIG. 3, a high level flow diagram 42 is shown, including preferred steps for operation of compactor control 14. After start block 44, control 14 will optionally determine the cotton yield based on signals from cotton yield monitor 25, as denoted at block 46. Control 14 will set parameters such as, but not limited to, the auger run time, direction of operation, and number of compaction strokes, and the positions of compactor apparatus 32 within compactor chamber 34, as denoted at block 48. As the module building process proceeds, compactor control 14 will either cycle through the steps of blocks 46–48 or end the routine if the module is complete, as denoted by block 50. As noted above, as the module nears completion, for instance, when the module exceeds a predetermined weight, compactor control 14 can output a module complete signal, such as a light or an audio signal, to alert the operator.

Figure 4:
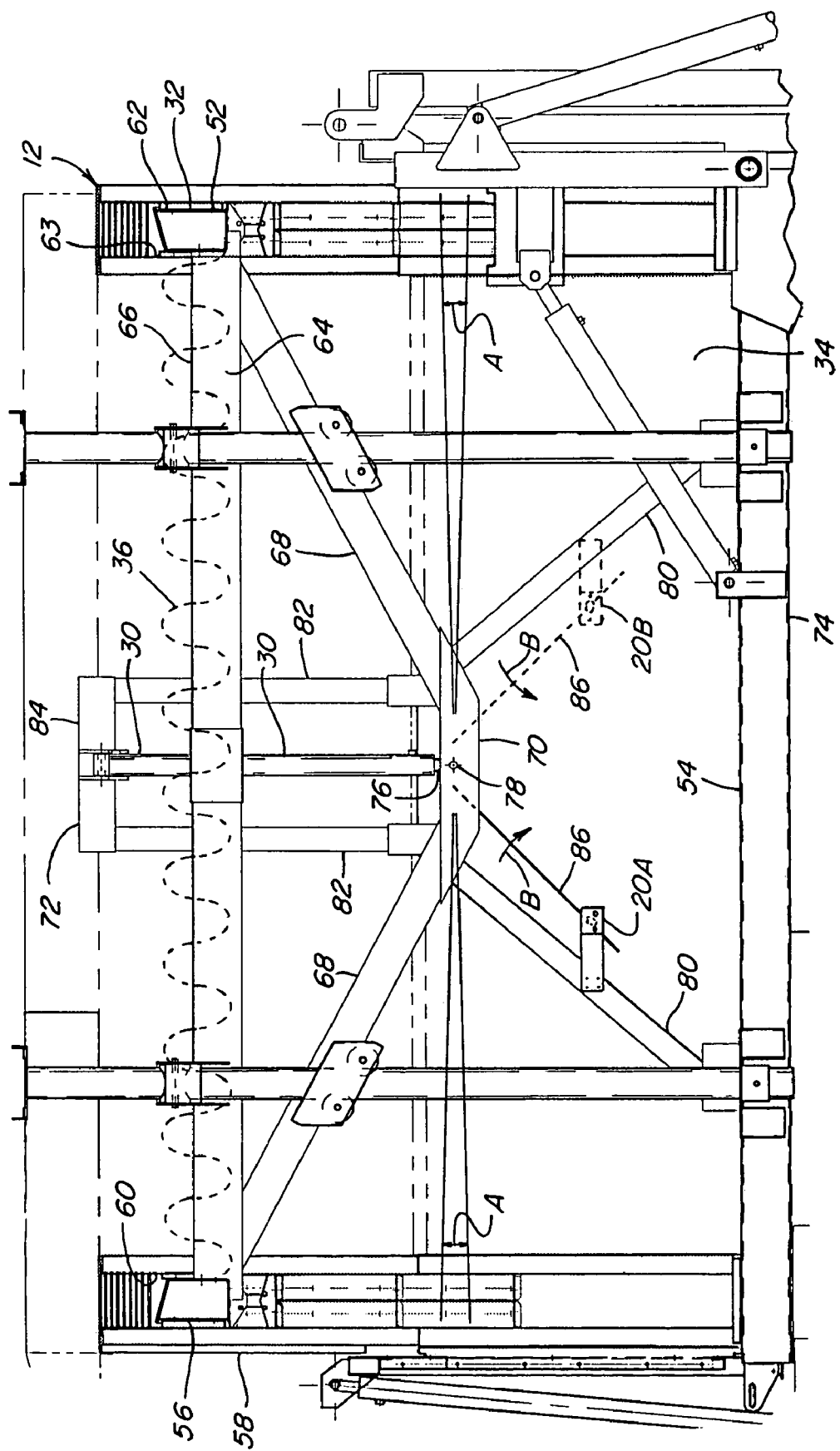
FIG. 4 is a fragmentary side view of the cotton module builder, showing compactor apparatus thereof tilted.
Figure 5:
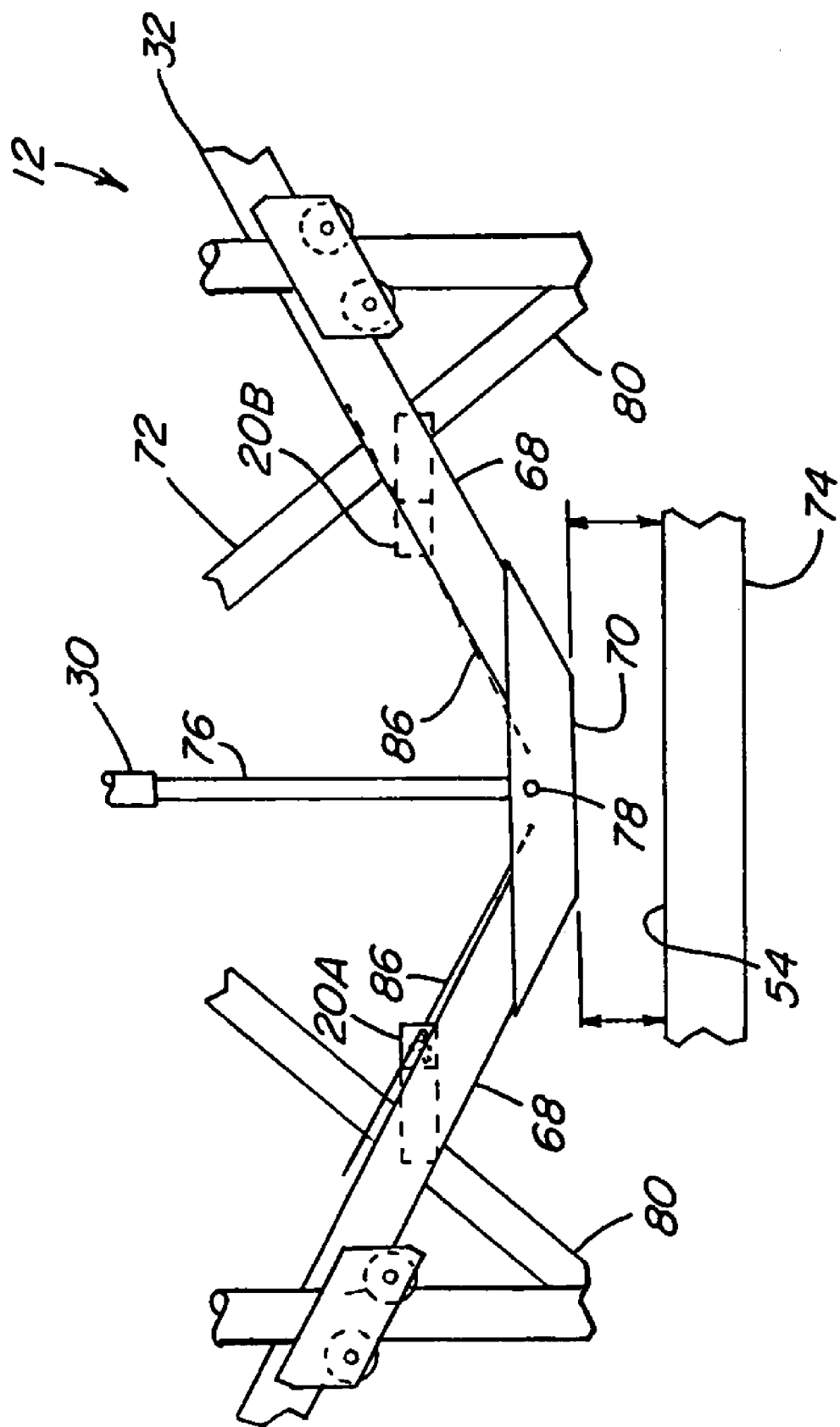
FIG. 5 is another fragmentary side view of the module builder showing the compactor apparatus tilted at a lowered position.

Referring also to FIGS. 4 and 5, compactor apparatus 32 includes a compactor frame 52 which is oriented generally horizontally, or within a range of small acute angles relative to horizontal, and substantially entirely disposed within compactor chamber 34, for movement downwardly against cotton contained therein for compacting the cotton against a floor 54 therein. Compactor frame 52 includes a front cross member 56 disposed in chamber 34 adjacent a front wall 58, and having opposite ends which extends through sidewardly open slots 60 in module builder 12. Similarly, a rear cross member 62 is disposed in chamber 34 and has opposite end portions which extend through sidewardly open slots 63 in the module builder. Augers 36 are supported in forward and rearward extending relation between cross members 56 and 62 within chamber 34. Augers 36 can be rotated using any suitable commercially available drivers, such as a gear drive driven by a motor such as a fluid or electric motor, or directly by fluid or electric motors, as desired, and as controlled by auger solenoids 38 and 40, for distributing the collected cotton in chamber 34 as will be explained. In this regard, it should be noted that it is desirable and a sought after feature to distribute the cotton evenly with respect to the plane of floor 54, such that the resultant compacted cotton module will have a substantially uniform height along its length and width.

Compactor frame 52 of compactor apparatus 32 is supported in compacting chamber 34 on each side by an exterior side structure 64, each structure 64 including a forwardly and rearwardly extending main beam 66 which extends between and connects front and rear cross members 56 and 62. Each side structure 64 additionally includes a pair of braces 68 which extend downwardly and at converging angles from front and rear cross members 56 and 62, and which are connected together by a gusset 70 located spacedly below about the middle of main beam 66. Here, it should be noted that compactor frame 52 located within compacting chamber 34 and exterior side structures 64 on the exterior of module builder 12 are movable upwardly and downwardly together.

The upward and downward movement of exterior side structures 64 and compactor frame 52 is preferably achieved and controlled by fluid cylinders 30 extending, respectively, between gussets 70 of each exterior side structure 64 and a support frame 72 supported by and extending upwardly from a frame 74 of module builder 12. Importantly, a rod 76 of each cylinder 30 is connected to gusset 70 at a pivot 78 which allows limited pivotal movement of side structure 64 and thus compactor frame 52 and augers 36 of compactor apparatus 32 about a side-to-side extending pivotal axis within a limited range of pivotal movement, as denoted by arrows A.

Support frame 72 on each side of module builder 12 includes a pair of diagonally extending braces 80 having lower ends connected to frame 74, and upper ends which connect to and support vertical braces 82 which support a cross member 84 to which fluid cylinder 30 is attached. A more forward brace 80 of support frame 72 on that side of module builder 12 facing outwardly from the page, and the more rearwardly located brace 80 on the opposite side of the module builder, support the compactor position sensors 20A and 20B, respectively. Each compactor position sensor 20A and 20B includes an elongate actuator arm 86 which pivotally connects to gusset 70 on that side of the module builder. Each sensor 20A and 20B is a rotary type sensor, which will detect rotational movement of the respective actuator arm 86, as denoted by arrows B, as compactor apparatus 32 is moved from the positions shown in FIGS. 1 and 4, for instance, to the lower position shown in FIG. 5. Because two compactor position sensors 20A and 20B are used, movements of compactor apparatus 32 at a tilt, such as denoted by arrow A, will result in different rotational displacements of actuator arms 86 of the respective sensors 20A and 20B, and thus the sensors will output different positional values. The difference between these positional values can be utilized for determining both the vertical position of compactor apparatus 34, and also any tilt thereof, such as denoted by arrow A, and also the direction of the tilt. Compactor position sensors can include, for instance, potentiometers, which vary a voltage or current signal when an input thereof is rotated. Actuators 86 can be slidable relative to the input to prevent binding when rotated as denoted by arrows B, and also when rotated in the opposite direction. For instance, a vertical position of the compactor apparatus can be determined from an average of the values outputted by sensors 20A and 20B.

Figure 6:
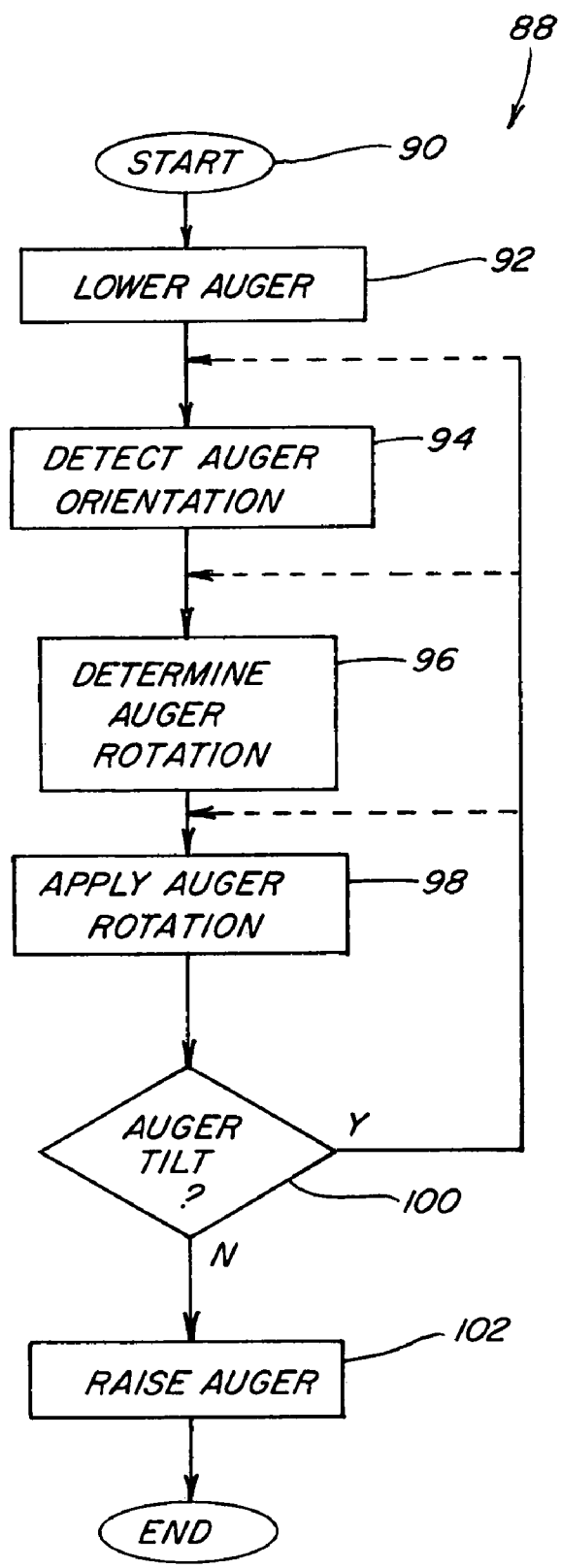
FIG. 6 is another high level flow diagram showing steps of a compactor position routine according to the invention.

Referring also to FIG. 6, another high level flow diagram 88 showing steps of a routine for determining appropriate directions of rotation, and also possibly duration of rotation, of augers 36 is shown. After a start block 90, compactor apparatus 32 is lowered to lower the augers 36, as denoted at block 92. At block 94, the orientation, that is, any tilt of augers 36 is detected, using signals from sensors 20A and 20B, generally as described above. Controller 16 will then determine the appropriate direction, and possibly duration, of the auger rotation, and apply that rotation, as denoted at blocks 96 and 98. Here, generally, if compactor apparatus 32 is tilted such that the rearward end is located higher than the forward end, the controller would likely determine that rotation in a forward direction would be appropriate, and the angle of the tilt can optionally be used in determining a projected or initial duration of the rotation. As one option, the augers can be operated for the determined time period, then automatically raised. As another option, at desired times during the rotation, or at the end of the designated duration, controller 16 can monitor signals from sensors 20A and 20B, to determine whether the augers are tilted, and by how much, as denoted at decision block 100. If tilt is present, controller 16 can continue to apply the auger rotation, or detect the auger orientation and determine a new auger rotation and apply that rotation. As still another alternative, if auger tilt is determined, the controller can determine an auger rotation, as denoted at block 96 and apply the determined rotation, as denoted at block 98. Once no auger tilt is detected, controller 16 can raise the augers, as denoted at block 102, and proceed to the next operational step, which can be, for instance, a compaction step, as denoted generally by block 48 in FIG. 3.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. Cotton compactor apparatus for a cotton module building chamber of a cotton module builder, comprising:
   a compactor frame supported in an upper region of the chamber by at least one compactor driver for downward movement in the chamber for compacting cotton accumulated in a lower region of the chamber, the frame supporting at least one auger operable at least in a first operating mode for moving cotton in contact therewith toward a first end of the chamber and in a second operating mode for moving cotton in contact therewith toward a second end of the chamber,
   wherein the at least one auger has a predetermined compacting orientation and is tiltable at acute angles to the compacting orientation by contact with accumulated cotton in the chamber which is higher toward one of the ends of the chamber than toward another of the ends, the apparatus including at least one sensor operable for sensing a condition representative of tilting of the at least one auger and outputting signals representative thereof, and a controller in connection with the at least one sensor for receiving the signals therefrom and in operative control of rotation of the at least one auger, the controller being automatically operable responsive to signals from the at least one sensor for determining an appropriate one of the operating modes for moving accumulated cotton in the chamber for reducing tilting of the at least one auger and controllably operating the at least one auger in the appropriate operating mode for reducing tilting of the at least one auger.

2. Cotton compactor apparatus of claim 1, wherein the controller is in operative control of the at least one compactor driver, and, after reducing tilting of the at least one auger by a desired amount, will automatically controllably operate the at least one compactor driver to move the compactor frame downwardly for compacting accumulated cotton in the chamber.

3. Cotton compactor apparatus of claim 1, wherein the compactor frame is supported for pivotal movement so as to be tiltable by tilting of the at least one auger, and the at least one sensor comprises two rotary sensors mounted on the module builder at different positions between the ends of the module building chamber, respectively, each of the rotary sensors including an input rotatable relative thereto and connected to a portion of the compactor frame so as to be rotated when the portion of the compactor frame is moved upwardly and downwardly, such that the sensors will simultaneously output signals which are about equal when the at least one auger is in the compacting orientation and moved upwardly and downwardly, and output signals which are different when the at least one auger is tilted in different directions.

4. Cotton compactor apparatus of claim 1, wherein when the at least one auger is tilted upwardly toward the first end of the chamber the controller will automatically determine that the appropriate one of the operating modes is the second operating mode, and when the at least one auger is tilted upwardly toward the second end of the chamber the controller will automatically determine that the appropriate one of the operating modes is the first operating mode.

5. Cotton compactor apparatus of claim 1, wherein the controller is in operative control of the at least one compactor driver, and, after tilting of the at least one auger is reduced, the controller will automatically controllably operate the at least one compactor driver to move the compactor frame upwardly for creating a space above accumulated cotton in the chamber for receiving additional cotton.

6. Cotton compactor apparatus of claim 1, wherein the controller is automatically operable to determine a duration of rotation of the at least one auger for eliminating tilting thereof, based on signals received from the at least one sensor.

7. Cotton compactor apparatus of claim 1, further comprising a yield monitor operable for outputting signals to the controller representative of a cotton yield, and the controller being automatically operable for determining a duration of operation for the at least on auger as a function at least partially of the signals received from the yield monitor.

8. Cotton compactor apparatus of claim 7, wherein the controller is operable for controlling movement of the at least one compactor driver, and will automatically determine and execute a number of downward compaction strokes of the at least one compactor driver at least partially as a function of the signals received from the yield monitor.

9. Cotton compactor apparatus of claim 1, wherein the at least one driver supporting the compactor frame in the chamber comprises two fluid cylinders on opposite sides of the module builder in connection with opposite sides of the compactor frame, respectively.

10. Cotton compactor apparatus of claim 9, wherein the fluid cylinders support the compactor frame for pivotal movement upwardly and downwardly in relation to the ends of the chamber.

11. A cotton module builder, comprising:
   a compactor frame supported in an upper region of a module building chamber of the module builder for downward movement into a lower region of the chamber and upward movement therefrom, the compactor frame having a compacting orientation generally parallel to a floor in the lower region, the compactor frame supporting at least one auger rotatable in a first direction for moving cotton in contact therewith toward a first end of the chamber and in a second direction for moving cotton in contact therewith toward the second end of a chamber, the compactor frame being pivotable in a first direction from the desired compacting orientation as a result of contact with accumulated cotton in the chamber so as to tilt upwardly toward the first end of the chamber and in a second direction so as to tilt upwardly toward the second end of the chamber, at least one sensor operable for sensing at least one condition representative of tilting of the compactor frame and outputting signals representative thereof, and a controller in connection with the at least one sensor for receiving the signals therefrom and in operative control of the rotation of the at least one auger, the controller being automatically operable when the compactor frame is tilted upwardly toward the first end of the chamber for responsively rotating the at least one auger in the second direction for moving cotton in contact therewith toward the second end of the chamber for reducing the tilting, and when the compactor frame is tilted upwardly toward the second end of the chamber for responsively rotating the at least one auger in the first direction for moving cotton in contact therewith toward the first end of the chamber for reducing the tilting.

12. The cotton module builder of claim 11, wherein the at least one sensor comprises two rotary sensors mounted on the cotton module builder, each of the sensors having an input and an elongate actuator arm which connects the input to the compactor frame such that tilting of the compactor frame upwardly toward the first and second ends of the chamber will result in different signals being outputted by the sensors, respectively.

13. The cotton module builder of claim 12, wherein the actuator arms are slidable relative to the inputs of the sensors, respectively, as the compactor frame is moved upwardly and downwardly in the chamber.

14. The cotton module builder of claim 12, wherein the controller is automatically operable for determining an elevation of the compactor frame in the chamber by determining an average value of signals outputted by the sensors.

15. The cotton module builder of claim 11, wherein the controller is in operative control of at least one driver operable for moving the compactor frame upwardly and downwardly in the chamber, and the controller will automatically operate the at least one driver to move the compactor frame upwardly after rotating the at least one auger such that the compactor frame is moved thereby to the compacting orientation.

16. The cotton module builder of claim 15, wherein the at least one driver comprises two fluid cylinders on opposite sides of the module builder and pivotally connected to opposite sides of the compactor frame, respectively, for allowing pivotal movement of the compactor frame relative to the module builder.

17. The cotton module builder of claim 15, further comprising a yield monitor operable for outputting signals representative of cotton yield conditions to the controller, the controller being operable for controlling movement of the at least one driver and automatically determining and executing at least one downward compaction stroke of the at least one driver at least partially as a function of the signals received from the yield monitor.

18. The cotton module builder of claim 11, wherein the controller is automatically operable to determine a duration of rotation of the at least one auger for eliminating tilting thereof based on signals received from the at least one sensor, and automatically rotating the at least one auger for the duration.

19. A method of operation of a cotton module builder, comprising steps of:
providing a compactor frame supported in an upper region of a module building chamber of the module builder for downward compacting movements against cotton accumulated in a lower region of the chamber and upward movement therefrom, the compactor frame having a generally horizontal compacting orientation and being pivotable in a first direction from the compacting orientation so as to tilt upwardly toward a first end of the chamber as a result of contact with a higher level of cotton in the chamber toward the first end compared to a second end of the chamber, and the compactor frame being pivotable in a second direction so as to tilt upwardly toward the second end of the chamber as a result of contact with a higher level of cotton in the chamber toward the second end compared to the first end, the compactor frame supporting at least one auger rotatable in a first direction for moving cotton in contact therewith toward the first end of the chamber and in a second direction for moving cotton in contact therewith toward the second end of the chamber;
providing at least one sensor operable for sensing at least one condition representative of tilting of the compactor frame and outputting signals representative thereof;
providing a controller in connection with the at least one sensor for receiving signals therefrom and in operative control of the rotation of the at least one auger;
the controller automatically operating responsive to one of the outputting signals of the at least one sensor and to the compactor frame being tilted upwardly toward the first end of the chamber, to rotate the at least one auger in the second direction for moving cotton in contact therewith toward the second end of the chamber for reducing the tilting; and
the controller automatically operating responsive to one of the outputting signals of the least one sensor and to the compactor frame being tilted upwardly toward the second end of the chamber, to rotate the at least one auger in the first direction for moving cotton in contact therewith toward the first end of the chamber for reducing the tilting.

20. The method of claim 19, comprising an additional step of the controller automatically determining an elevation of the compactor frame in the chamber by determining an average value of signals outputted by the at least one sensor.

21. The method of claim 19, wherein the controller is in operative control of at least one driver operable for moving the compactor frame upwardly and downwardly in the chamber, and the controller will automatically operate the at least one driver to move the compactor frame upwardly after rotating the at least one auger such that the compactor frame is moved thereby to the compacting orientation.

22. The method of claim 21, comprising further steps of:
providing a yield monitor operable for outputting signals representative of cotton yield conditions to the controller; and
when the compactor frame is in the compacting orientation, the controller controlling movement of the at least one driver and automatically determining and executing at least one downward compaction stroke of the at least one driver at least partially as a function of the signals received from the yield monitor.

23. The method of claim 19, comprising a further step of when tilting is sensed, the controller will automatically determine a duration of rotation of the at least one auger for eliminating tilting thereof based on signals received from the at least one sensor, and responsive to the sensed tilting automatically rotating the at least one auger for the duration.

24. A method of operation of a cotton compactor of a cotton module builder, comprising steps of:
providing the cotton compactor includes a compactor frame supported in an upper region of a module building chamber of the module builder for downward compacting movements against cotton accumulated in a lower region of the chamber and upward movement therefrom, the compactor frame having a generally horizontal compacting orientation and being pivotable in a first direction from the compacting orientation so as t6 tilt upwardly toward a first end of the chamber as a result of contact with a higher level of cotton in the chamber toward the first end compared to a second end of the chamber, and the compactor frame being pivotable in a second direction so as to tilt upwardly toward the second end of the chamber as a result of contact with a higher level of cotton in the chamber toward the second end compared to the first end, the compactor frame supporting an auger rotatable in a first direction for moving cotton in contact therewith toward first end of the chamber and in a second, direction for moving cotton in contact therewith toward the second end of the chamber;

providing at least one sensor operable for sensing at least one condition representative of tilting of the cotton compactor and outputting signals representative thereof;

providing a controller in connection with the at least one sensor for receiving said signals therefrom and in operative control of the rotation of the auger;

detecting tilting of the cotton compactor relative to a desired orientation thereof resulting from contact with cotton accumulated in the module builder and from the outputting signals of the at least one sensor;

determining a direction of rotation of the auger of the cotton compactor from the detected tilting of the cotton compactor, for moving the accumulated cotton for reducing the tilting;

rotating the auger to eliminate the tilting; then operating the compactor in a compacting mode for compacting cotton in the module builder.

25. The method of claim 24, comprising a further step of determining a duration of rotation of the auger required for eliminating the tilting.

\* \* \* \* \*